(12) United States Patent
Meindl et al.

(10) Patent No.: US 7,878,361 B2
(45) Date of Patent: Feb. 1, 2011

(54) LOCKING DEVICE FOR FIXING A LID

(75) Inventors: Peter Meindl, Ternitz (AT); Franz Lang, Wimpassing (AT); Eduard Lack, Wiener Neustadt (AT); Ernst Glanz, Grimmenstein (AT); Helmut Seidlitz, Ternitz (AT); Albert Trukses, Enzenreith (AT)

(73) Assignee: Natex Prozesstechnologie GesmbH, Ternitz (AT)

( * ) Notice: Subject to any disclaimer, the term of this patent is extended or adjusted under 35 U.S.C. 154(b) by 1078 days.

(21) Appl. No.: 10/589,312

(22) PCT Filed: Feb. 10, 2005

(86) PCT No.: PCT/AT2005/000043

§ 371 (c)(1),
(2), (4) Date: Aug. 10, 2006

(87) PCT Pub. No.: WO2005/075879

PCT Pub. Date: Aug. 18, 2005

(65) Prior Publication Data

US 2007/0175904 A1     Aug. 2, 2007

(30) Foreign Application Priority Data

Feb. 10, 2004   (AT) ................ A 195/2004

(51) Int. Cl.
*B65D 45/00* (2006.01)
*B65D 45/28* (2006.01)
*B65D 45/32* (2006.01)
*B65D 45/34* (2006.01)

(52) U.S. Cl. .............. 220/323; 220/316; 220/319; 220/321; 220/324; 220/582

(58) Field of Classification Search ............. 220/316, 220/321, 323, 582, 319, 324, 810; 292/49, 292/256.65; 49/394, 395, 465
See application file for complete search history.

(56) References Cited

U.S. PATENT DOCUMENTS 1,808,403 A      6/1931  Eklund
2,670,799 A *    3/1954  Dobbs ................ 220/324
4,102,474 A *    7/1978  Platts ................ 220/323

(Continued)

FOREIGN PATENT DOCUMENTS

AT          397 420          4/1994

(Continued)

*Primary Examiner*—Anthony Stashick
*Assistant Examiner*—Madison L Wright
(74) *Attorney, Agent, or Firm*—Davis & Bujold, P.L.L.C.

(57) ABSTRACT

In a locking device for the fixation of a lid (1) on an opening (8) of a pressure container with at least two locking segments (5) displaceable at right angles to the axis of the opening 98), which segments (5) bear protrusions (6) and groove-like recesses along their circumference, which in the locked position cooperate with recesses (7) and protrusions along the brim of the opening (8), the displacement actuator (4) of the segments (5) is linked to the segments (5) and to at least one point of application that is on the lid (1) or on a member (3) connected to the lid (1). The segments (5) are arranged in the direction of the circumference of the lid (1) and are pivotably supported on the lid (1) by a swivel arm (16), separate from the displacement actuator (4), being interposed.

15 Claims, 6 Drawing Sheets

U.S. PATENT DOCUMENTS 4,303,177 A * 12/1981 Amtmann .................. 220/323
5,711,450 A * 1/1998 Reneau ...................... 220/319
2003/0192433 A1* 10/2003 Steiner ....................... 95/287

FOREIGN PATENT DOCUMENTS

| DE | 42 05 867 | 9/1992 |
| EP | 0 272 123 | 6/1988 |
| FR | 1527144 | 5/1968 |
| GB | 2 134 206 | 8/1984 |

* cited by examiner

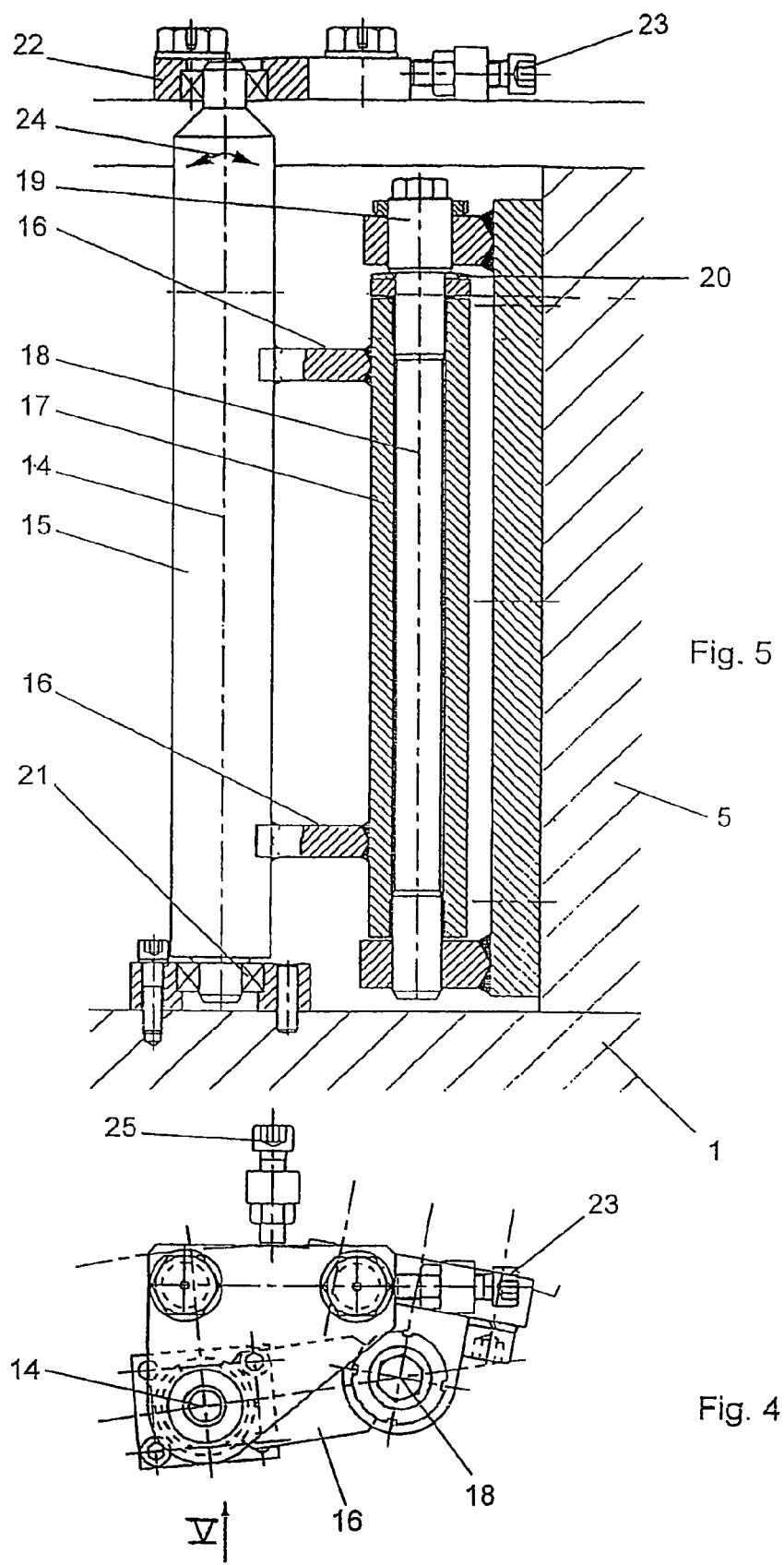

though pendulum-like manner, whereby small deviations from the exact locking position of the segments can be accommodated without problems and without the danger of overstraining and without the danger of big eccentric loads being generated, whereby also overall smaller actuating forces for the radial displacement of the segments can be provided.

LOCKING DEVICE FOR FIXING A LID

This application is a national stage completion of PCT/AT2005/000043 filed Feb. 10, 2005 which claims priority from Austrian Application Ser. No. A 195/2004 filed Feb. 10, 2004.

FIELD OF THE INVENTION

The invention relates to a locking device for the fixation of a lid on an opening of a pressure container with at least two locking segments displaceable at right angles to the axis of the opening, which segments bear protrusions and groove-like recesses along their circumference, which in the locked position cooperate with recesses and protrusions along the brim of the opening, whereby the displacement actuator of the segments is linked to the segments and to at least one point of application that is on the lid or on a member connected to the lid.

BACKGROUND OF THE INVENTION

Pressure containers, and specifically tubular pressure containers, are used inter alia in chemical engineering. Particularly at wide diameters of lids and accordingly high pressures the force effective on such lids gets exceedingly high and requires precise and fail-safe locking devices. A range of quick-lock mechanisms has become known, whereby a known locking device consists of comparatively heavy, bracket forming parts, which can be pivoted about an axis generally parallel to the axis of the container, to free the lid. For big containers this results in exceedingly heavy and comparatively big device parts. Other known quick-lock mechanisms too require at correspondingly high forces more massive designs of both the container brim and the locking bolts, as such locking mechanisms contain a plurality of drilling holes radially to the container axis along the circumference of the container. The lid of the container at such designs too contains a plurality of drilling holes radially to the container axis, which have to be aligned with the drilling holes on the brim of the container, whereupon the locking bolts are inserted into the aligned drilling holes. All forces are in this case received by bolts, which have to be accordingly big, to be able to withstand the heavy load.

For such locks to latch with correspondingly smaller, lighter and safer to actuate device parts, despite great acting forces, AT 397 420 proposed to arrange multipart locking members, which are formed in the style of a multipart ring, which together form a segment lock. The individual locking segments are moved into circumferential grooves on the inside brim of the opening of the container and are fastened in this position.

With increasing lid size and increasing pressure the forces that have to be accommodated get exceedingly higher, as mentioned earlier, and therefore such a lock comprising segments requires bigger device parts, which contain a plurality of circumferential grooves or protrusions respectively arranged on top of each other in an axial direction of the opening to accommodate the corresponding pressure forces via the sum of such grooves and protrusions. The increase of the installation size of the segments in this manner results in a corresponding increase in weight of the segments and requires special measures, to guarantee a safe driving without the danger of straining the actuator or the guiding of the segments from a non engaged position into an engaged position in order to lock the lid.

SUMMARY OF THE INVENTION

The invention aims to provide a locking device of the initially mentioned type, with which relatively big and heavily built locking segments can be moved safely with small forces from a non engaged position into an engaged position, and with which the safety of the locking is safeguarded with large-scale segments, too. For solving this object the inventive embodiment of the formerly presented locking device generally consists in that the segments arranged in a circumferential direction of the lid are pivotably supported on the lid, with a swivel arm, being separate from the displacement actuator, being interposed. Thus, by the segments being pivotably supported on the lid by such interposed swivel arms, the danger of overstraining of linear guides, as were used until now, can be avoided and an optimal adjustment of the segments in the closed position without overstraining the actuators can be assured. Overall smaller actuators can be used. Compared to known embodiments, whereby sometimes not exactly defined frictional forces are generated that affect the correct displacement path or the displacement actuator of the locking segments respectively, here only a linkage is effected, but not a linear guiding of the segments in radial direction, such that big and heavy segments can be safely brought into the locking position even under eccentric loads. Eccentric loads can be accommodated without the breaking or damage of parts of the segments. Hereby it is essential that the swivel arm is separate from the displacement actuator. The swivel arm is thus not a part of the actuating chain for driving the locking segments. The swivel arm rather has the function of guiding the particular segment with a defined freedom of movement and supporting it with defined resilience, whereby the swivel arm does not take up any forces resulting from the inner pressure of the container.

An accordingly small built actuator for the displacement or dislocation of the segments into their locking position can be hereby particularly attained by that the displacement actuator of the segments is each made up of at least one linear actuator per segment, which linear actuator is linked to the segments and at least one point of application of the lid or of a member connected to the lid. Such a linear actuator is hereby particularly meant to be a hydraulic and/or pneumatic cylinder piston aggregate as well as an electro mechanic or electro hydraulic linear actuator. Particularly for big locking segments more linear actuators per segment can be used, whereby a corresponding pivotability of the segments over the whole adjusting range can be safeguarded and results in that a safe pressing of the segments into the corresponding locking grooves can be ensured with no eccentric loads occurring. The segments in the locking position can cooperate, particularly in the case of more linear actuators being arranged per segment, over their whole circumference with the grooves and protrusions at the brim of the opening respectively already after a short adjusting range, whereby small actuating forces and correspondingly small built linear actuators and in particular hydraulic or pneumatic cylinder piston aggregates can be used here. A further reduction of the eccentric load and thus a further enhancement of the safety can be achieved in that the points of application of the displacement actuator on the segments and/or on the lid or the member connected with the lid are designed as hinge bearings comprising bearing pins being pivotable about at least one axis.

Generally the inventive swivel arm for the linkage or flexible joint of the segments with the lid now allows a number of further enhancements relating to the reduction of the necessary displacement force. Particularly such a swivel arm enables the support of the segments in the lid in a floating or hanging position, in which frictional forces are eliminated. To this point a preferred embodiment is so designed, that the pivotable support of the segments on the lid comprises at least one pivotable shaft or pivot axle extending at right angles to the displacement movement of the segments, whereby a sliding or rubbing contact of the locking elements at the lid surface can be reduced or prevented if the segments are connected to the lid to be adjustable in an in axial direction of the pivot axis in the height direction.

In principle such a swivel arm can itself be pivoted by a linear actuator, which in turn flexibly adjoins the swivel arm and the lid, whereby a preferred embodiment consists in that the swivel arm is connected to the lid via a rotary or swivel drive respectively.

To safeguard that for such an overhung suspension of the segments, in which naturally only very small adjusting forces for the actuation of the locking segments are necessary, this overhung position over the whole adjustment path as well as within the manufacturing allowances of the lid surface is maintained, it is sensible, to allow for a corresponding fine tuning of the pivotability of the swivel arm and hence of the axial height adjustability of the segments. For this end the embodiment is advantageously so devised, that the axle or swivel axis respectively is supported on the lid on at least one bearing being moveable at right angles to the swivel axis and fixable in this adjusted position, whereby such an embodiment as well accommodates for torsional stresses at differing segment weights. In an especially simple way the height adjustable support of the segments is devised in the way that the axle or swivel axis carries a bushing parallel to the axis, in which the segments are pivotable and in direction of the axis height adjustably fixable, whereby the support is advantageously effected such that the segments are supported flexibly and height adjustable on the bushing with in axial direction operative springs being interposed.

Overall by the bilateral, autonomous actuation of each segment an insertion of the segments even in the case of unilateral frictional resistances is safeguarded, as no momentary stresses on the guides are in effect. The segments can each adapt in the desired way to the outline without guiding or adjustment measures, whereby the pivotable joint relative to the lid, i.e. a central linkage instead of a linearly guided one, entails that the construction becomes insensitive to deformation due to inner pressure and the segments can be inserted on the smoother-running side first, depending on the remaining frictional forces, whereby the insertion on the other side will be eased. The central linkage of the corresponding locking segments leads to a very unproblematic, tangential adjustment of the segment positions, which is of paramount importance for the final locking by insertion of the locking bolts. The overhung guidance of the segments allows for high and narrow segments to be used, which usually had a high tilting danger, as a corresponding support via the swivel axis and the bushing parallel to this axis occurs. The range of application of the locking device will be considerably extended in this way not only to higher pressures but also to larger locking diameters, whereby abrasion along a sliding surface can be eliminated and whereby also elaborate lubrication of sliding surfaces becomes dispensable. Particularly in the food sector such sliding surfaces to be lubricated would pose a hygiene problem. The segment actuators may not only be devised weaker but also in problematic circumstances may be moved by hand, as the frictional forces are generally eliminated. The linkage itself can be designed for a defined torsional behaviour, whereby the linkage not only carries the assigned segment but also allows for the segments to go along the elastic deformation of the locking system due to internal pressure onto the lid, without destroying the bearing of the linkage.

The use of said spring element allows for the exact setting up of the desired clearance and in this way for the guiding of the segment marginally above the lid, whereby the spring element facilitates particularly in the bracing into the locked position an according correction of the position in height, without overstraining the bearing.

The biaxial adjustability of the swivel axis leads to a tilting about two horizontal axes being at right angles to each other and thus to an accurate parallel adjustment of the segment to the lower support surface. All slated positions occurring due to deformation, bearing clearances and manufacturing imprecisions can thus be compensated for.

As already mentioned, this exact achievement of the locking position causes that the locking segments can be inserted easily. The embodiment is preferably designed so that the segments comprise at least two recesses or bearing eyes for the reception of locking members or locking pins.

In principle this inventive locking device can be used for vertically arranged tubular pressure containers as well as horizontal autoclaves or pressure containers. For horizontal locking corresponding additional constructs for the pivotability of the lid and the locking device have to be provided. In these cases the embodiment is advantageously designed in such a way that the lid and the segments linked to the lid are mounted to a support to be pivotable about an axis intersecting or crossing the axis of the opening, the support together with the lid being pivotable about an axis extending outside of the opening and perpendicular to the axis of the opening. Such a support allows to provide corresponding fastening-, adjustment-, force discharge points, whereby for the aim of avoiding overstrain in the sealing elements at the locking movement of the lid, the embodiment is preferably so devised that the lid is connected to the support by a spring rod having an adjustable position and being eccentrically arranged between the lid and the support. The spring suspension of the lid hereby enforces the correct horizontal angular position of the lid, whereby the sealing abrasion due to radial components of the movement is reduced. The springs simultaneously correspondingly compensate for the normally not adjustable imprecisions, which are ascribed to manufacturing tolerances.

To safeguard, that the desired locking position is in fact attained, corresponding control devices are proposed. A particularly preferred embodiment hereby lies in that actuating members of a position switch are provided, which actuating members immerse in annular grooves at right angles to the brim of the opening.

BRIEF DESCRIPTION OF THE DRAWINGS

The invention is subsequently better described by means of schematic drawings of exemplary embodiments. In these, FIG. 1 schematically shows a lid in intersection, FIG. 2 a top view onto an embodiment according to FIG. 1 with details of the actuator of the locking elements, FIG. 3 a detailed view of FIG. 2, FIG. 4 a larger scale top view of a detail of the linkage of the segments on the lid, FIG. 5 a view in direction of arrow V in FIG. 4, FIG. 6 details of a end position detector for the indication of the correct locking position and FIG. 7 a modified embodiment for the actuation of a lid for generally horizontal pressure containers.

DETAILED DESCRIPTION OF THE INVENTION

Figure 1:
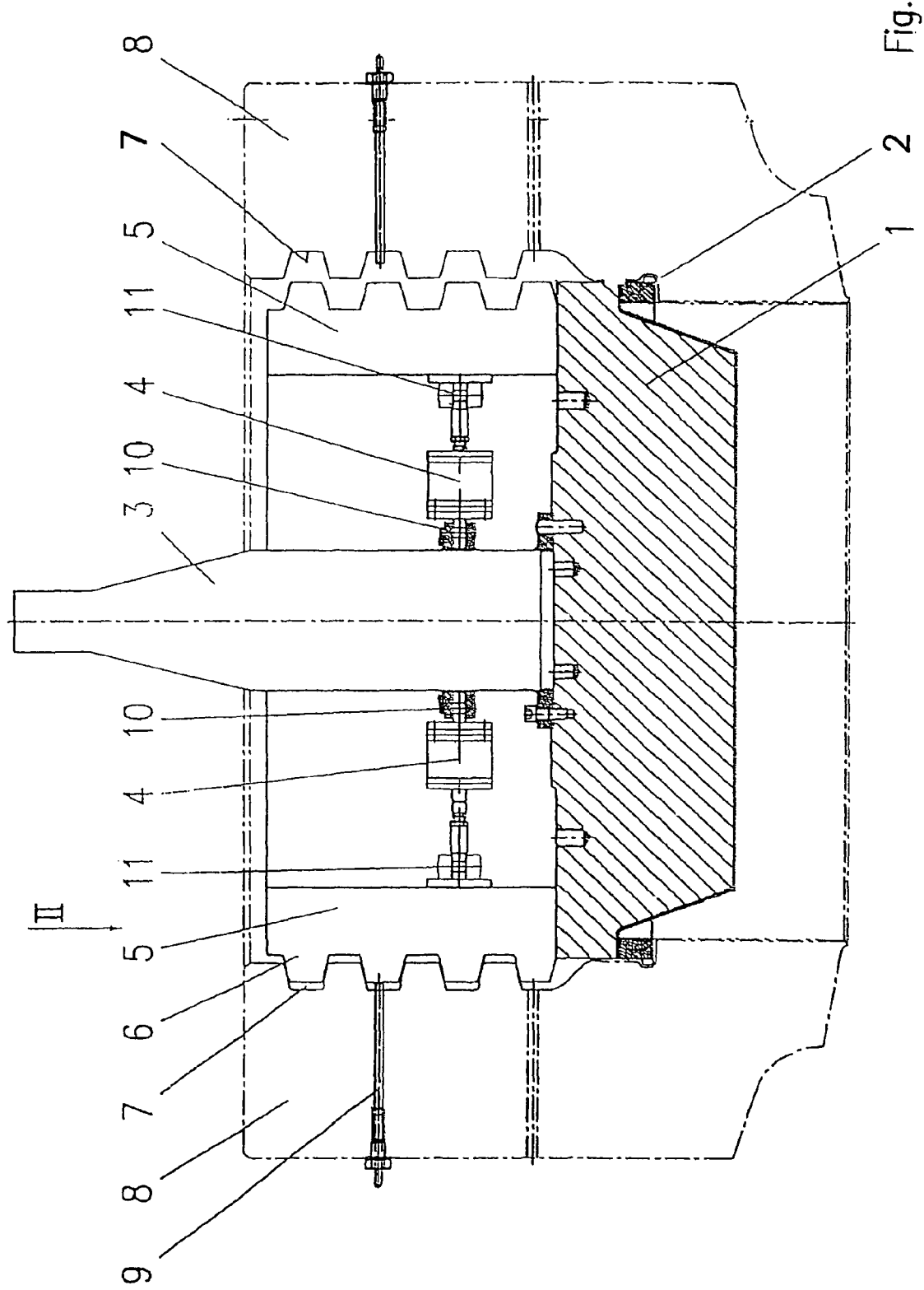

FIG. 1 shows a lid 1, which seats solidly on top of annular sealing elements 2. The lid 1 is raised or lowered by a central actuating rod 3, whereby this central actuating rod 3 simultaneously forms the counter bearing for hydraulic cylinder piston aggregates 4 for the actuator of the locking segments 5. The locking segments 5 on the left hand side of the drawing according to FIG. 1 are in the locking position and engage with their circumference ribs 6 with corresponding grooves 7 on the brink 8 of the container, whereby an actuating rod 9 for a position switch is schematically indicated. On the right hand side of the drawing according to FIG. 1 the segments 5 are still not engaged with the circumference grooves 7 on the brink 8 of the container.

The cylinder-piston aggregates 4 are via hinge bearings 10 flexibly connected with the device part connected with the lid 1, namely, the actuating rod 3. Further the cylinder-piston aggregates 4 engage via pivot bearings 11 with the segments 5.

Figure 2:
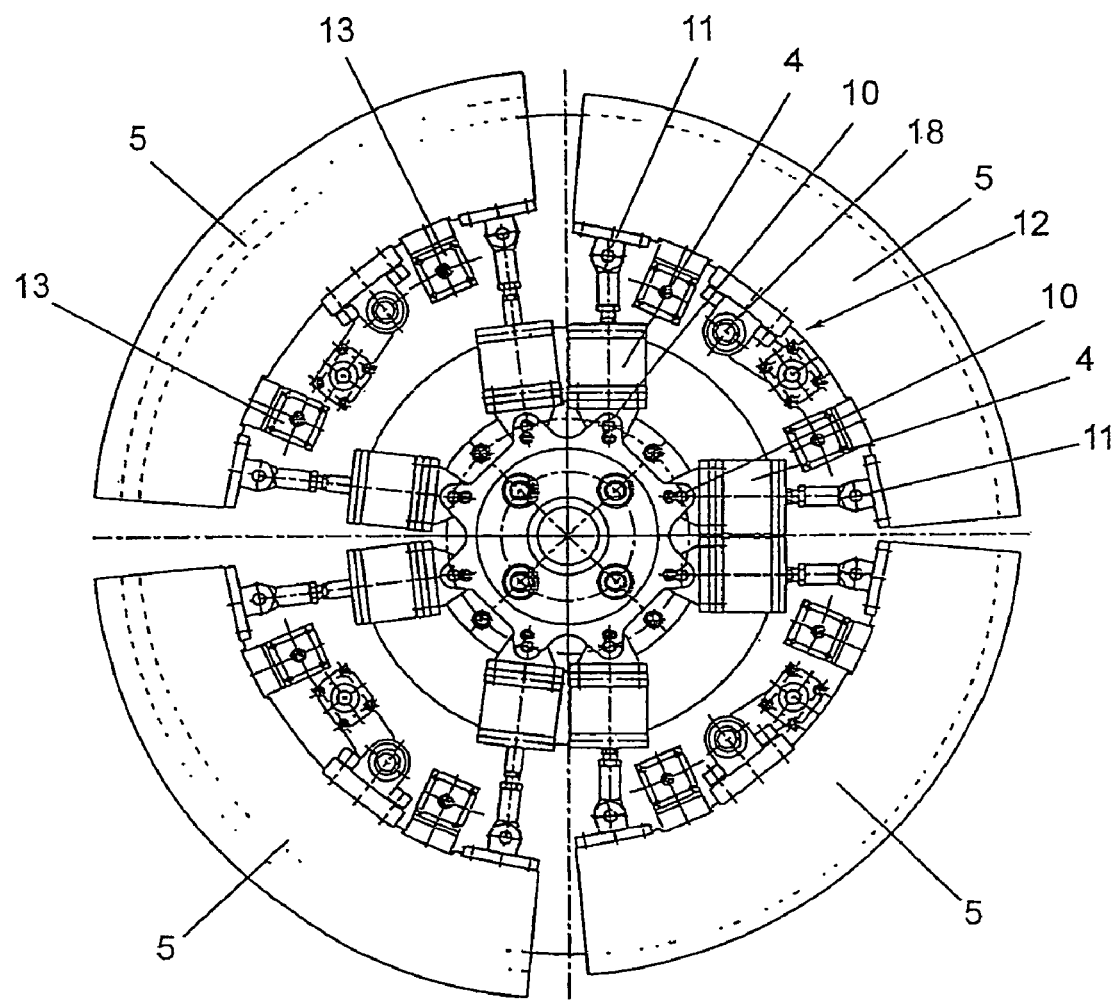
Figure 3:
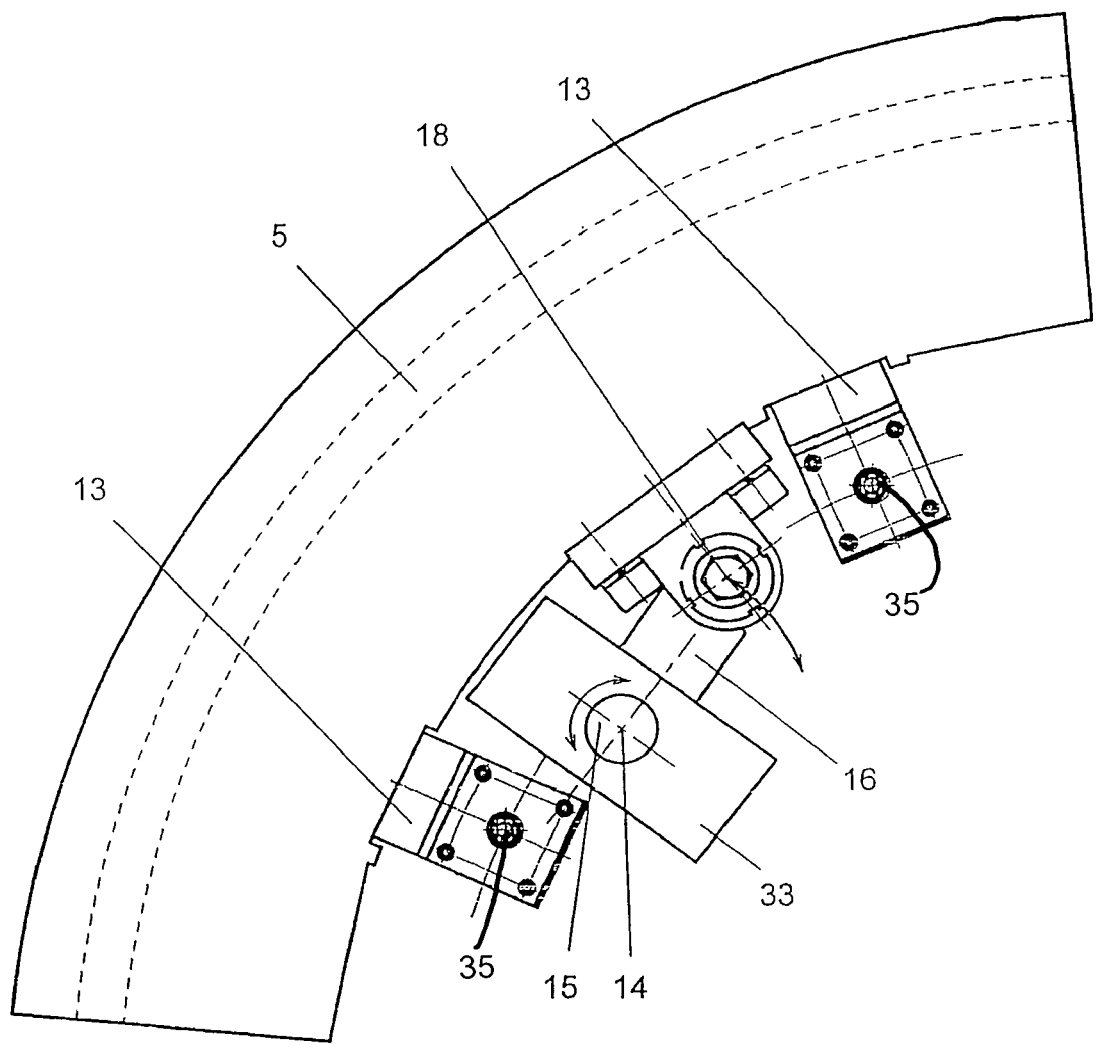

As seen in the illustration according to FIG. 2, for each segment 5 two hydraulic cylinder-piston aggregates 4 are provided. The segments 5 again comprise the pivot bearings 11 and are further connected via a joint 12 to the lid 1, whereby this joint 12 is more closely pictured in FIG. 3 and FIG. 4 and possesses a swivel axis extending generally normal to the lid surface. In the embodiment according to FIG. 2 ears 13 are further visible, into which after locking of the segments 5 corresponding safety pins can be introduced, to additionally lock the locking position mechanically. In the embodiment according to FIG. 3 a possible swivel drive of the swivel arm 16 is schematically indicated with 33.

In the illustration according to FIGS. 4 and 5 it becomes apparent that the segments 5 are pivotably supported on the lid 1. To this means an axle 15 is provided, which shapes the swivel axis 14, whereby this axle 15 is connected with swivel arms 16, which in turn carry a bushing 17. A bolt 19 is pivotably supported about an axis 18 in this bushing 17, the bushing being rotatable about the axis 14 with the radius of the swivel arms 16, whereby the bolt 19 is supported on the bushing 17 with cup springs being interposed and itself is connected with the segments 5. The segments 5 can thus be rotated about the axis 18 in the bushing 17 and are supported in the height direction by a cup spring 20 being interposed, such that the lid 1 adjoining lower edge of the segments 5 abuts with as small a grinding friction as possible on the lid 1, and particularly is anchored overhung across from the lid 1. To compensate for torsional tensions and to safeguard an overhung suspension along the whole displacement- and swivel way, it is possible to fine-tune the swivel axis 14. The axle 15 including the swivel axis 14 is to this measure initially supported in a bearing 21 on the lid 1 and can be adjusted correspondingly in a bearing block 22 at its end facing away from the pivot point, which can be particularly seen in FIG. 4. An adjusting screw 23 hereby allows for the whole bearing block 22 to be shifted to pivot the axis 14 in direction of the double headed arrow 24, whereby the further adjustment screw 25 apparent in FIG. 4 allows for a pivoting in and out of the drawing plane. Hence in total such an overhung position of the segments can be achieved, which requires minimal moving forces for the movement of the segments into the locked position, even when heavy and big locking segments 5 are used.

Figure 6:
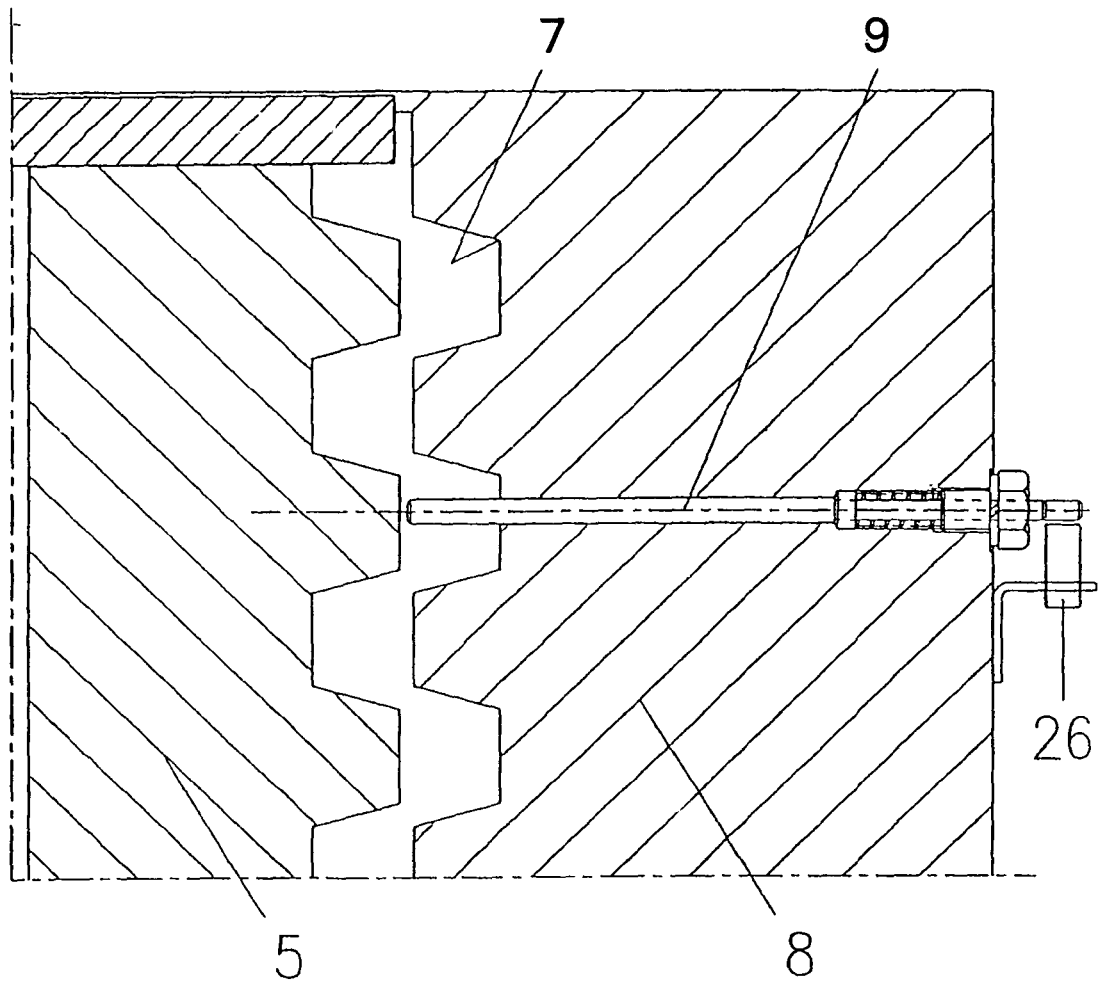

As seen in the illustration according to FIG. 6, it is possible to arrange at the outside of the brim 8 of the pressure container a position switch 26, which can be activated by an actuating member 9 plunging into a groove 7. Using these actuating members 9 the exact position and hence the exact locking position can be scanned by radial pivoting or displacement of the segments 5 respectively.

Figure 7:
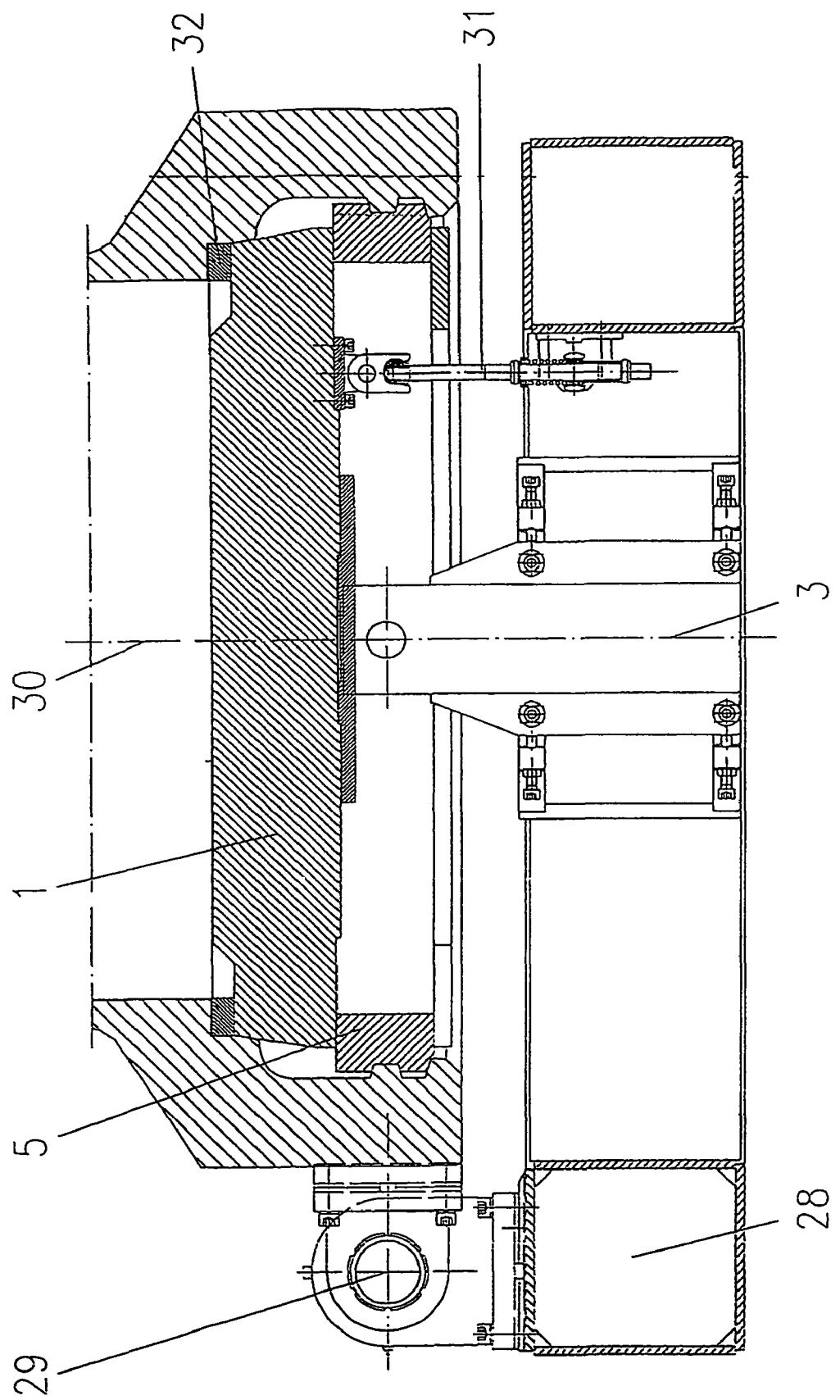

In the illustration according to FIG. 7 a generally horizontal pressure container is envisaged, the lid 1 of which is fixed to a carrier 28 via a part 3 connected with the lid. The carrier 28 is pivotable about an exterior axis 29 together with the lid 1 and the actuating member 3 of the lid 1, whereby the exact angular position of the lid 1 relative to an axis 30 is held in by tolerances predefined boundaries by a spring rod 31 being interposed, to prevent the sealing elements 32 at the brim of the container opening from overstraining and destruction. The segments 5 can be radially moved outwards by an actuator not shown in FIG. 7, whereby this actuator again is pivotably mounted on the central part 3 and generally corresponds to the embodiments according to FIGS. 1 and 2.

The invention claimed is:

1. A locking device for the fixation of a lid (1) in an opening of a pressure container with at least two locking segments (5) that are displaceable at right angles to an axis of the opening, the segments (5) bear protrusions (6) and groove-like recesses about an outer circumferential face, which in a locked position cooperate with recesses (7) and protrusions along a brim (8) of the opening, a displacement actuator of the segments (5) is linked to the segments (5) and to at least one point of application that is on the lid (1) or on a member (3) connected to the lid (1);

wherein the segments (5) are arranged in the direction of the circumference of the lid (1) and are pivotably supported on the lid (1) by a swivel arm (16), separate from the displacement actuator, that is interposed between the segments (5) and the lid (1), the swivel arm (16) in turn is pivotably connected to the segments (5); and pivotable support of the segments (5) on the lid (1) comprises at least one pivotable shaft (15) or pivot axle (14) that extend at right angles to displacement movement of the segments (5).

2. The locking device according to claim 1, wherein the displacement actuator of the segments (5) is each made up of at least one linear actuator (4) per segment (5).

3. The locking device according to claim 1, wherein the points of application of the displacement actuator on at least one of the segments (5), the lid (1) and the member (3) connected with the lid (1) are designed as hinge bearings (10, 11) comprising bearing pins being pivotable about at least one axis.

4. The locking device according to claim 1, wherein the swivel arm (16) is connected to the lid (1) via a rotary or swivel drive (33).

5. The locking device according to claim 1, wherein the segments (5) are connected to the lid (1) and adjustable along a pivot axis (14) to facilitate adjustment of an axial separation of the segments (5) from the lid (1) along the pivot axis (14).

6. The locking device according to claim 1, wherein the pivotable shaft (15) or the pivot axis (14) is supported on the lid (1) on at least one bearing (22) being moveable at right angles to the swivel axis (14) and fixable in this adjusted position.

7. The locking device according to claim 1, wherein the pivotable shaft (15) or the pivot axis (14) carries a bushing (17) parallel to the pivot axis (14), in which the segments (5) are pivotable and axially fixable in a direction along the pivot axis (14).

8. The locking device according to claim 7, wherein the segments (5) are supported pivotably, via operative springs (20), on the bushing (17) and are axially adjustable along the pivot axis (14) to facilitate adjustment of an axial distance between the segments (5) and the lid (1).

9. The locking device according to claim 1, wherein the segments (5) comprise either at least two recesses, which receive locking members or ears (13) that comprise bearing eyes (35) which receive locking pins.

10. The locking device according to claim 1, wherein the lid (1) and the segments (5) linked to the lid (1) are mounted to a support (28) to be pivotable about an axis intersecting or crossing the axis (30) of the opening, the support (28) together with the lid (1) being pivotable about an axis (29) extending outside of the opening and perpendicular to the axis (30) of the opening.

11. The locking device according to claim 10, wherein the lid (1) is connected to the support (28) by a spring rod (31) having an adjustable position and being eccentrically arranged between the lid (1) and the support (28).

12. The locking device according to claim 1, wherein actuating members (9) of a position switch (26) are provided, which actuating members (9) immerse in the recesses (7) of the brim (8) at right angles to the brim (8) of the opening.

13. A locking device for fixing of a lid (1) in an opening of a pressure container, the device comprising:

at least two locking segments (5), each having an outer surface with protrusions (6) and recesses;

at least two actuating units (4) communicate with each of the at least two locking segments (5), each of the at least two actuating units (4) is coupled, via a hinge bearing (10), to an actuating rod (3) which is centrally supported by the lid (1); and each locking segment (5) is pivotably coupled, via swivel arms (16), to a pivotable shaft (15) which is rotatably fixed to the lid (1) such that rotation of the pivotable shaft (15) biases the respective locking segment (5) radially outwardly at right angles to a central axis of the opening from an unlocked position to a locked position in which the protrusions (6) of the locking segment (5) engage grooves (7) in a brim (8) of the pressure container.

14. The locking device according to claim 13, wherein the swivel arms (16) are fixed at one end to the pivotable shaft (15) and an opposed end to a bushing (17), a bolt (19) axially secures the locking segment (5) to the bushing (17) such that the locking segment (5), the bushing (17) and the pivotable shaft (15) are axially parallel.

15. The locking device according to claim 14, wherein a cup spring (20) is supported coaxially with the bushing (17) and the bolt (19), between the locking segment (5) and the bushing (17), and axially biases the locking segment (5) with respect to pivotable shaft (15).

\* \* \* \* \*